United States Patent [19]
Koyama et al.

[11] Patent Number: 5,808,431
[45] Date of Patent: Sep. 15, 1998

[54] MOTOR ROTATIONAL SPEED CONTROL APPARATUS

[75] Inventors: Satoru Koyama, Yokohama; Akiko Fukuhara, Tokyo, both of Japan

[73] Assignee: Canon Kabushiki Kaisha, Tokyo, Japan

[21] Appl. No.: 651,703

[22] Filed: May 21, 1996

[30] Foreign Application Priority Data

May 22, 1995 [JP] Japan .................................. 7-146850
Oct. 31, 1995 [JP] Japan .................................. 7-305223

[51] Int. Cl.⁶ .................................................. B60L 13/00
[52] U.S. Cl. .......................... 318/278; 318/271; 318/810; 388/844; 388/814
[58] Field of Search ..................... 318/263, 800, 318/801, 802, 803, 799, 798, 269, 807, 278, 810, 271, 280, 254, 138, 268, 270, 685, 696; 388/800, 805, 809, 812, 844, 847, 814

[56] References Cited

U.S. PATENT DOCUMENTS

| | | | |
|---|---|---|---|
| 4,250,435 | 2/1981 | Allet et al. | 318/138 |
| 4,922,169 | 5/1990 | Freeman | 318/254 |
| 5,332,956 | 7/1994 | Oh | 318/799 |
| 5,424,763 | 6/1995 | Komiya et al. | 318/85 |
| 5,442,268 | 8/1995 | Harada | 318/280 |

FOREIGN PATENT DOCUMENTS

| | | |
|---|---|---|
| 0247624A | 12/1987 | European Pat. Off. . |
| 0345556A | 12/1989 | European Pat. Off. . |
| 0349447A | 1/1990 | European Pat. Off. . |
| 58-069483 | 7/1983 | Japan . |

Primary Examiner—John W. Cabeca
Attorney, Agent, or Firm—Fitzpatrick, Cella, Harper & Scinto

[57] ABSTRACT

A motor rotational speed control apparatus is constructed by a control unit for performing an instruction to accelerate a rotational speed of a motor, an instruction to decelerate, or an instruction to maintain a rotational speed, a driving unit for driving the motor in accordance with an instruction outputted from the control unit, and first and second wires for transferring the instruction of the control unit to the driving unit. The control unit shows the instruction by a combination of signal levels of a first signal and a second signal and transmits the first and second signals to the driving unit through the first and second wires, and the driving unit drives the motor in accordance with the combination of the signal levels of the first and second signals.

10 Claims, 9 Drawing Sheets

MOTOR ROTATIONAL SPEED CONTROL APPARATUS

BACKGROUND OF THE INVENTION

1. Field of the Invention

The invention relates to a motor rotational speed control apparatus for accelerating and decelerating a rotational speed of a motor.

2. Related Background Art

In a motor constructing a laser scanning unit of a laser beam printer as a kind of printers, a precision of its rotational speed is required.

FIG. 1 is a perspective view showing a construction of a main section of the laser beam printer. FIG. 2 is a side elevational view of FIG. 1.

Reference numeral 101 denotes an image signal (VDO signal). The image signal 101 is inputted to a laser unit 102. Reference numeral 103 denotes a laser beam which is on/off modulated by the laser unit 102; 104 a scanner motor for rotating a rotary polygon mirror 105 at a stationary speed; and 106 an image forming lens. A laser beam 107 deflected by the polygon mirror is focused onto a photosensitive drum 108 as a scanning surface by the image forming lens 106. Therefore, the laser beam 107 modulated by the image signal 101 is horizontally scanned (scanning in the main scanning direction) onto the photosensitive drum 108.

Reference numeral 109 denotes a beam detection port for inputting the laser beam from a slit-shaped incident port. The laser beam entering from the incident port passes in an optical fiber 110 and is guided to a photoelectric converting device 111. The laser beam converted to an electric signal by the photoelectric converting device 111 is amplified by an amplifying circuit (not shown). After that, it becomes a horizontal sync signal (hereinafter, referred to as a BD signal). Reference numeral 112 denotes a recording paper. A latent image which is formed on the photosensitive drum 108 is visualized by a developing unit 123 shown in FIG. 2 and becomes a toner image. The toner image is transferred to the recording paper 112 by a transfer unit 120. The image of the recording paper 112 onto which the toner image was transferred is fixed by a fixing unit 121 shown in FIG. 2. The paper is ejected from a paper ejection unit 122.

Conventional control circuit and driving circuit (scanner motor driving control system) of the scanner motor 104 will now be described with reference to FIGS. 9 and 10.

FIG. 9 is a block diagram showing a construction of the scanner motor driving control system. FIG. 10 is a timing chart for signals shown in FIG. 9. Each of a printer engine control circuit 201 and a scanner motor control unit 202 is constructed by a different integrated circuit.

The printer engine control circuit 201 outputs a clock CK of a period corresponding to a resolution of the image formation to the scanner motor control unit 202 through a wire. The clock CK is frequency divided into ½ n period by a second frequency divider 203 in the scanner motor control unit 202. On the other hand, a rotational speed of the scanner motor 104 is converted into a rectangular wave S11 according to the rotational speed by a rotational speed detector 205. The signal S11 from the rotational speed detector 205 is sent to the scanner motor control unit 202 and is frequency divided into ½ m period by a first frequency divider 206 provided in the scanner motor control unit 202.

Reference numeral 207 denotes a leading edge pulse generator and 208 indicates a trailing edge pulse generator. The pulse generators 207 and 208 generate pulses S13 and S14 at timings of a leading edge and a trailing edge of a frequency divided signal S12 from the first frequency divider 206, respectively. Reference numeral 209 denotes a first counter for counting only a predetermined number of clocks which were frequency divided by the second frequency divider 203.

The first counter 209 starts to count from a time point when the leading edge pulse S13 is inputted and generates an output signal S15 at the high level for a period of time of the counting operation. Similarly, a second counter 210 starts to count from a time point when the trailing edge pulse S14 is inputted and generates an output signal S16 at the high level for a counting period of time (refer to FIG. 10).

A signal S17 obtained by synthesizing the output signals S15 and S16 of the two counters 209 and 210 by a waveform synthesizer 211 is supplied to a scanner motor driver 212 through a wire 17. The signal S17 has three states of the high level (H), low level (L) and high impedance as shown in the following table 1. The high level, low level, and high impedance denote the acceleration, neutral, and deceleration, respectively. The "neutral" denotes that the present speed is maintained. In accordance with the signal S17, the driver 212 controls the rotational speed of the scanner motor 104.

TABLE 1

| Output S15 of the 1st counter | Output S16 of the 2nd counter | Signal S17 of wire 17 | Driver 212 |
|---|---|---|---|
| H | H | L | deceleration |
| H | L | high impedance | neutral |
| L | H | high impedance | neutral |
| L | L | H | acceleration |

Namely, when the rotational speed of the scanner motor 104 is slower than a target speed, by setting the signal S17 to the high level, the acceleration is instructed. When the rotational speed is faster than the target speed, the deceleration is instructed by setting the signal S17 to the low level. Further, when the rotational speed lies within a range of the target rotational speed, by setting the signal S17 to the high impedance, it is instructed to maintain the present speed (neutral). The scanner motor driver 212 integrates the signal S17 from the scanner motor control unit 202 by an integrator 212A in the driver 212 and supplies a voltage according to the signal S17 to the scanner motor 104, thereby rotating the motor 104.

Each of the scanner motor driver 212 and scanner motor control unit 202 is constructed by an integrated circuit. The scanner motor driver 212 and scanner motor control unit 202 are connected by the one wire 17.

The above conventional scanner motor driving control system, however, has the following problems. First, the wire 17 is easily influenced by the noises as compared with the inside of the other integrated circuit. In case of maintaining the present rotational speed as it is, namely, when neither the acceleration nor the deceleration is performed, the signal S17 that is outputted from the scanner motor control unit 202 to the scanner motor driver 212 is set to the high impedance. However, the state of the high impedance is also easily influenced by a small noise. There is, consequently, a fear such that the scanner motor 104 erroneously operates and there is a possibility such that an influence is exerted on the image formation. Since the clock CK from the printer engine control circuit 201 is outputted to the scanner motor control unit 202 through the wire, noises due to the clock are generated from the wire. Therefore, it is necessary to provide a noise generation preventing circuit.

SUMMARY OF THE INVENTION

It is an object of the invention to provide a motor rotational speed control apparatus which can solve the foregoing drawbacks.

Another object of the invention is to provide a motor rotational speed control apparatus which is hardly influenced by noises and can be realized at low costs.

The above and other objects and features of the present invention will become apparent from the following detailed description and the appended claims with reference to the accompanying drawings.

DETAILED DESCRIPTION OF THE PREFERRED EMBODIMENTS

Figure 1:
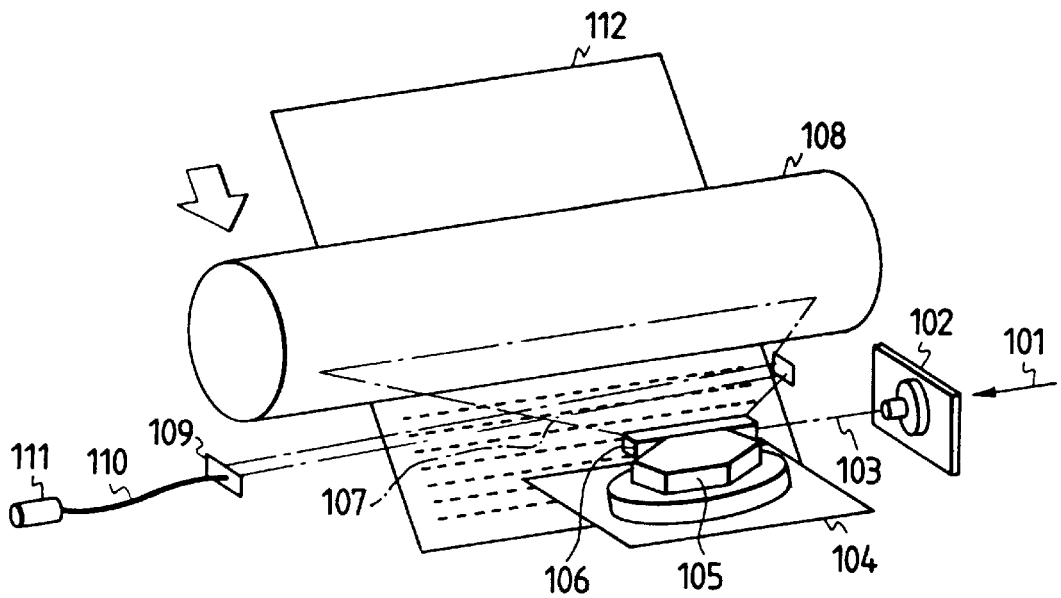
FIG. 1 is a perspective view showing a construction of a main section of a laser beam printer.
Figure 2:
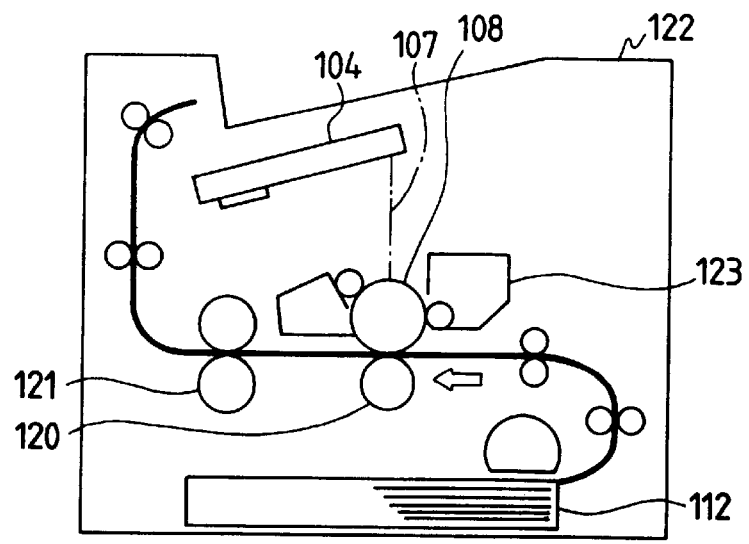
FIG. 2 is a cross sectional view of a laser beam printer.

A mechanical construction of a laser beam printer of an embodiment according to the invention is substantially the same as that in FIGS. 1 and 2 mentioned above.

Figure 3:
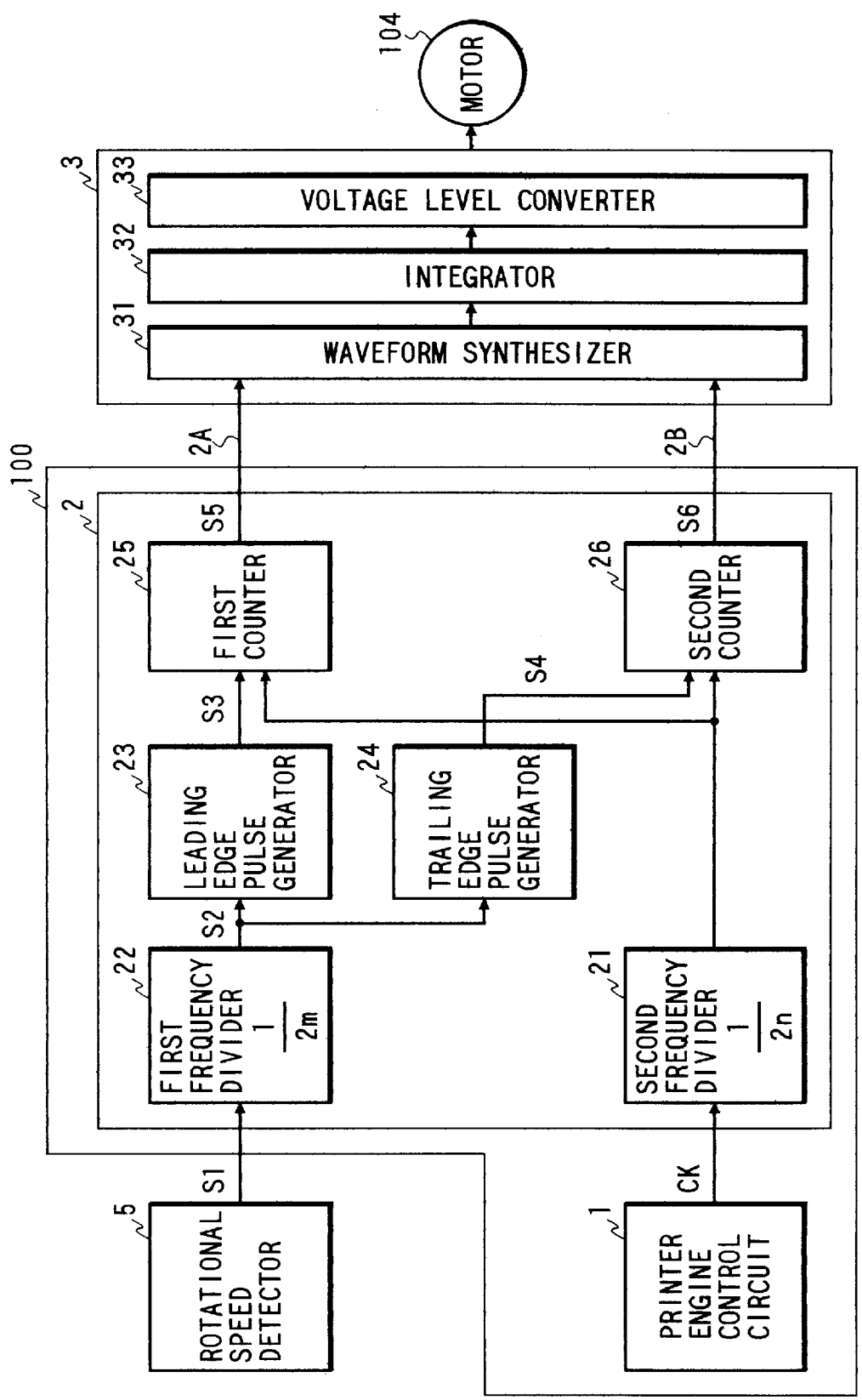
FIG. 3 a block diagram showing a construction of a scanner motor driving control system according to the first embodiment.

FIG. 3 is a block diagram showing a construction of a scanner motor driving control system of the first embodiment of the invention.

Reference numeral 1 denotes a printer engine control circuit. An output of the circuit 1 is connected to a scanner motor control unit 2 for controlling a rotational speed of a rotary polygon mirror to a speed within a predetermined range. An output of the scanner motor control unit 2 is, further, inputted to a scanner motor driver 3 through two wires 2A and 2B. Each of the scanner motor control unit 2 and scanner motor driver 3 is constructed by a different integrated circuit. Each of the scanner motor control unit 2 and printer engine control circuit 1 is a logic circuit and is constructed as one integrated circuit 100.

The scanner motor driver 3 drives the scanner motor 104. A rotational speed of the scanner motor 104 is detected by a rotational speed detector 5. A detection signal S1 of the detector 5 is fed back to the scanner motor control unit 2 through a signal line S1.

The printer engine control circuit 1 generates the clock CK of the period according to a resolution of the image formation to the scanner motor control unit 2. In the embodiment, since the output of the clock CK is not transmitted via the wire (in one integrated circuit), the generation of noises can be suppressed. The clock CK is frequency divided into ½ n period (for example, ⅛ period) by a second frequency divider 21 in the scanner motor control unit 2. The rotational speed of the scanner motor 104 is converted into the rectangular wave signal S1 according to the rotational speed by the rotational speed detector 5. The waveform of the rectangular wave signal S1 has a long period when the rotational speed of the scanner motor 104 is slow and has a short period when the rotational speed is fast.

Figure 4:
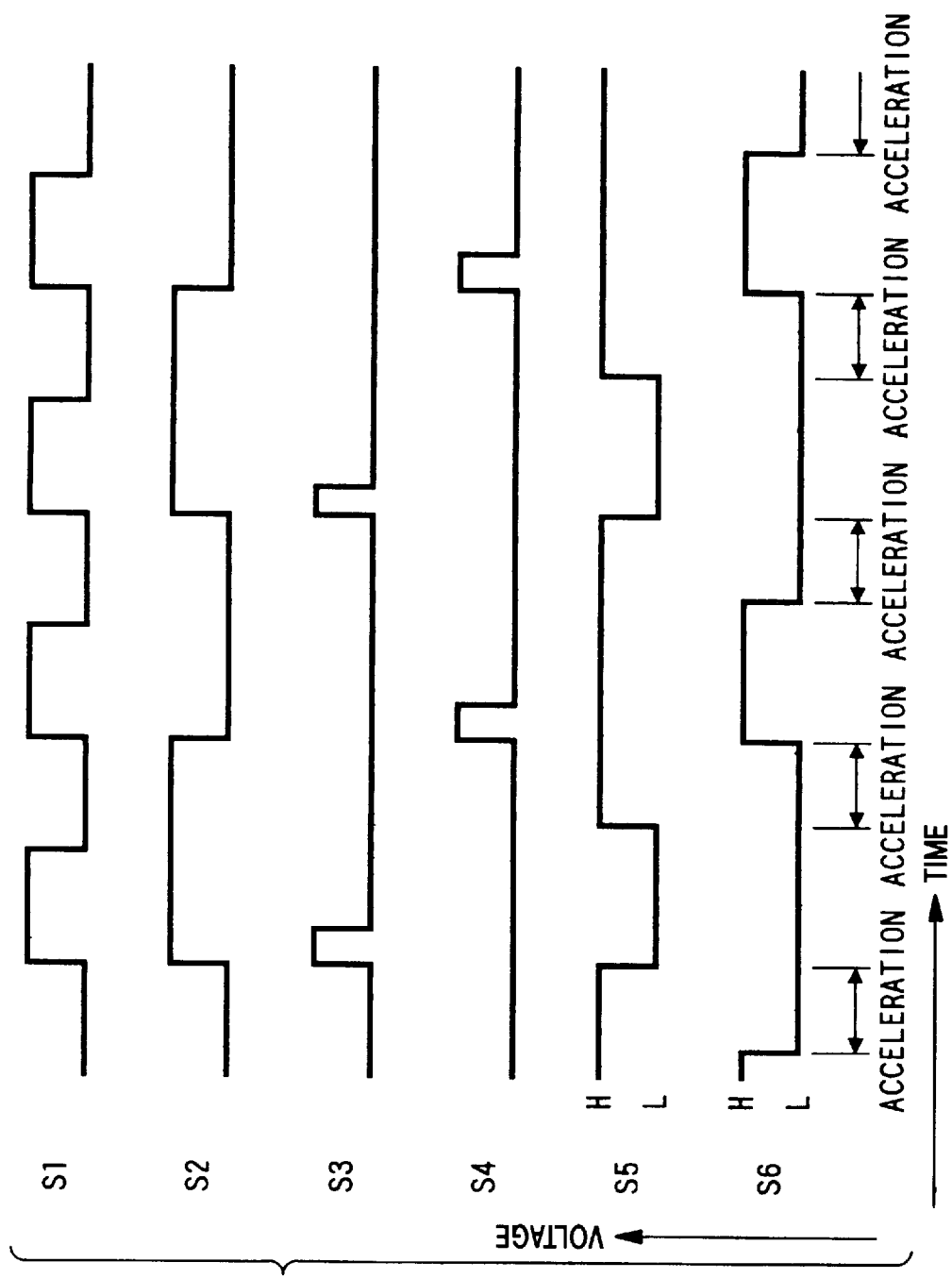
FIG. 4 is a timing chart for signals in a circuit of FIG. 3.

The signal S1 from the speed detector 5 is sent to the scanner motor control unit 2 and is frequency divided into ½ m period (for example, b ½ period) by a first frequency divider 22. Further, a leading edge pulse generator 23, a trailing edge pulse generator 24, a first counter 25, and a second counter 26 are provided in the scanner motor control unit 2. Among them, the pulse generators 23 and 24 generate pulses S3 and S4 at the timings of the leading edge and trailing edge of a signal S2 obtained by frequency dividing by the first frequency divider 22, respectively (refer to FIG. 4).

The first counter 25 counts only a predetermined number of clocks CK which were frequency divided by the second frequency divider 21. The counter 25 starts to count from a time point when the leading edge pulse S3 is inputted and generates an output signal S5 at the low level for such a counting period of time (refer to FIG. 4). When the count value reaches a predetermined value, the signal S5 is set to the high level. Similarly, the second counter 26 starts to count from a time point when the trailing edge pulse S4 is inputted and generates an output signal S6 at the high level for such a counting period of time (refer to FIG. 4). When the count value reaches a predetermined number, the signal S6 is set to the low level.

The output signal (first signal) S5 of the first counter 25 and the output signal (second signal) S6 of the second counter 26 are transmitted to the scanner motor driver 3 through the two wires 2A and 2B as output signals from the scanner motor control unit 2, respectively.

States which are transferred to the scanner motor driver 3 by the two signals S5 and S6 are as shown in Table 2.

TABLE 2

| 1st signal S5 | 2nd signal S6 | Driver 3 |
|---|---|---|
| H | H | neutral |
| H | L | acceleration |
| L | H | deceleration |
| L | L | neutral |

Namely, in the case shown in Table 2, when the first signal S5 is at the high level and the second signal S6 is at the low level, the acceleration state is shown. When the first signal S5 is at the low level and the second signal S6 is at the high level, the deceleration state is shown. Further, when both of the first signal S5 and the second signal S6 are at the low level or when both of the first and second signals S5 and S6 are at the high level, the neutral state is shown.

The scanner motor driver 3 synthesizes the waveforms of the first and second signals S5 and S6 by a waveform synthesizer 31 and generates a voltage according to the waveform level by a voltage level converter 33 through an integrator 32. The voltage is supplied to the scanner motor 104.

As mentioned above, in case of transmitting a command from the scanner motor control unit 2 to the scanner motor driver 3 constructed by another integrated circuit different from the scanner motor control unit 2, the two signals S5 and S6 are transmitted as a combination as shown in Table 2 through the signal lines 2A and 2B. Therefore, in case of instructing the neutral state, since there is no need to use the high impedance state as in the conventional apparatus, the apparatus which is hardly influenced by the noises can be obtained.

According to the construction, since the acceleration and deceleration are instructed by a combination such that either one of the signals S5 and S6 is set to the high level and the other is set to the low level, the apparatus is hardly influenced by the noises as shown below.

Figure 5:
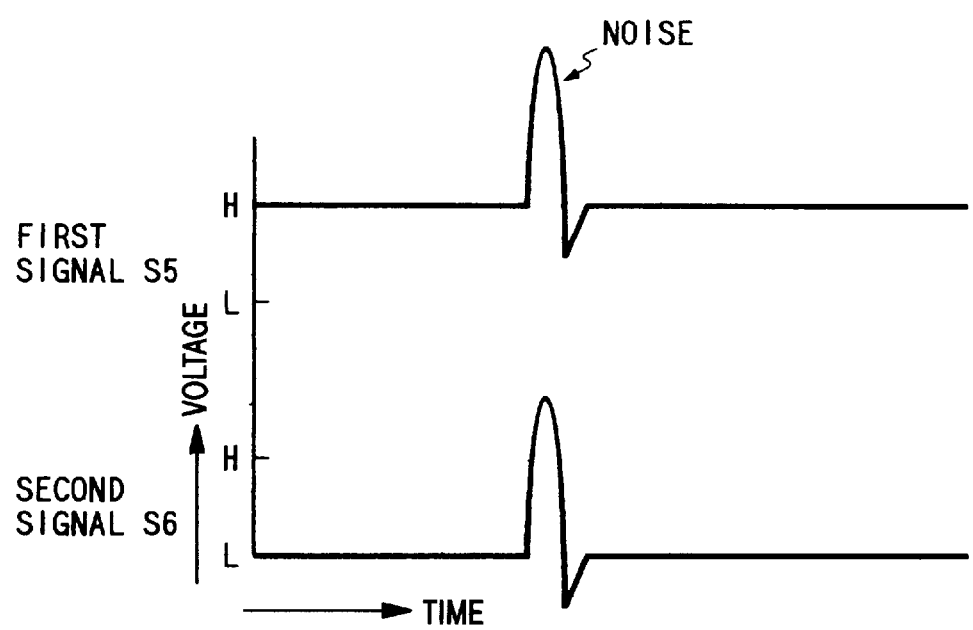
FIG 5 is a diagram showing a state when noises are mixed to wires 2A and 2B.

FIG. 5 is a diagram showing a state of the waveforms of the first and second signals S5 and S6 in the case where the noises are mixed to the first and second signal lines 2A and 2B when the acceleration instruction (S5 =H, S6 =L) is being outputted to the scanner motor driver 3.

As shown in the diagram, both of the first and second signals S5 and S6 are instantaneously set to the high level by the noises. Namely, as will be understood with reference to Table 2, the instruction to maintain the present speed is instantaneously set and the rotational speed of the scanner motor 104 is neither accelerated nor decelerated. Now, assuming that the apparatus is constructed in a manner such that the acceleration is instructed when (S5 =H, S6 =H), the deceleration is instructed when (S5 =L, S6 =L), and the maintenance of speed (neutral) is instructed when (S5 =H, S6 =L; or S5 =L, S6 =H), when the noises are mixed during the deceleration instruction, the acceleration instruction is made, so that the speed fluctuates and is not stable. As mentioned above, the relations between the signals S5 and S6 of the embodiment and the acceleration, deceleration, and speed maintenance can suppress the influence by the noises as much as possible. To obtain an effect similar to that mentioned above, it is also possible to set the relations as shown in the following Table 3. T,140

To obtain the output of Table 3, it is sufficient to set the outputs of the first and second counters 25 and 26 to values opposite to those mentioned above.

In the embodiment, since the printer engine control circuit 1 and scanner motor control unit 2 have been constructed as one integrated circuit 100, the generation of the noises of the clock CK can be suppressed. The integrated circuit 100 can be manufactured by the costs similar to the costs of the integrated circuit of the printer engine control circuit 201 which has conventionally been manufactured. Therefore, the costs can be substantially saved by the cut amount corresponding to the manufacturing costs of the conventional scanner motor control unit 202. The apparatus has been constructed in a manner such that the integrated circuit 100 and scanner motor driver 3 are connected by the two wires, when the signals of the two wires are different, the acceleration or deceleration is instructed, and when they are equal, it is instructed to maintain the speed. Therefore, a situation such that the rotational speed of the motor 104 is not set to the instructed speed due to the noises from the outside or the rotational speed fluctuates can be suppressed by a simple construction as much as possible.

In the case where a resolution of an image which is formed by the foregoing laser beam printer is switched, particularly, when the resolution is changed from a high level resolution to a low level resolution, the rotational speed of the scanner motor 104 is reduced from a first rotational speed to a second rotational speed slower than the first rotational speed. For example, in case of switching the resolution from 600 d.p.i. to 300 d.p.i., the rotational speed of the scanner motor 104 is switched from the ordinary rotational speed (first rotational speed) to the half rotational speed (second rotational speed).

In the embodiment, in the case where an instruction to switch the resolution is generated from the outside of the printer, in the foregoing scanner motor driving control system, a combination of the first and second signals S5 and S6 is forcedly set to the deceleration state for a predetermined time. By forcedly decelerating the scanner motor 104 as mentioned above, the resolution can be switched at a higher speed.

Explanation will now be made with respect to a construction such that the motor 104 doesn't run away when either one or both of the wires 2A and 2B in FIG. 3 are made non-conductive due to a breaking, a defective contact, or the like.

Figure 6:
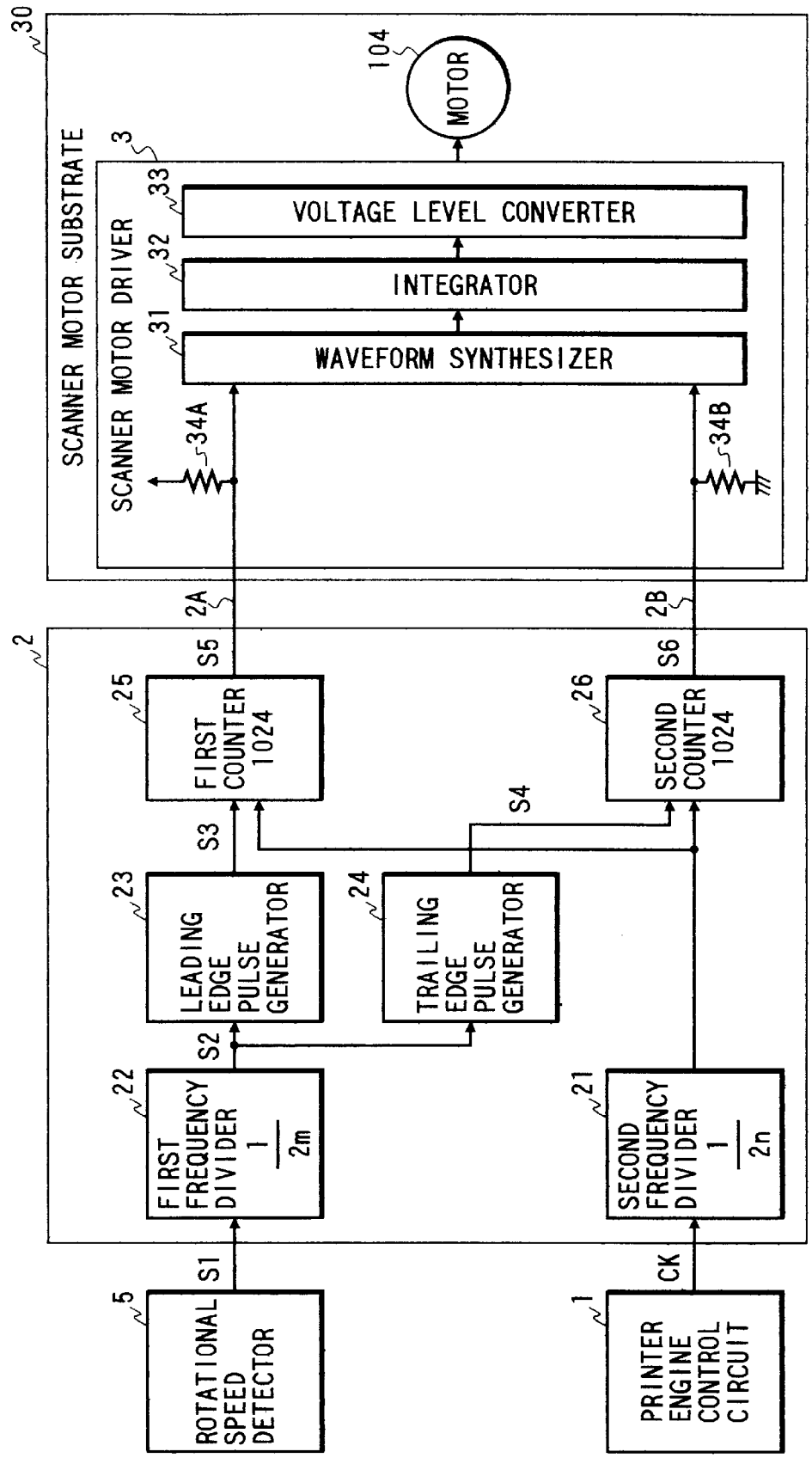
FIG. 6 is a block diagram showing a construction of a scanner motor driving control system according to another embodiment.

FIG. 6 is a block diagram showing a construction to prevent a run-away of the motor in the construction for instructing the relation in Table 3 mentioned above.

A pull-up resistor 34A is connected to the signal line 2A on a scanner motor substrate 30 so as to set the first signal S5 to the high level when the first wire 2A is broken. Thus, when the second signal S6 is at the high level, the neutral state can be set. When the second signal S6 is at the low level, the deceleration state can be set. It is possible to prevent that the motor 104 runs away and reaches an abnormal rotational speed.

Similarly, a pull-down resistor 34B is connected to the signal line 2B on the scanner motor substrate 30 so as to set the second signal S6 to the low level when the second wire 2B is broken. Thus, when the first signal S5 is at the low level, the neutral state can be set. When the first signal S5 is at the high level, the deceleration state can be set. It is possible to prevent that the motor 104 runs away and reaches an abnormal rotational speed.

When both of the wires 2A and 2B are broken, since the signal S5 is set to the high level and the signal S6 is set to the low level, so that the deceleration state can be set. In this manner, even in any nonconductive state, the motor 104 doesn't run away.

In case of the construction of Table 2 mentioned above, by connecting the pull-down resistor to the wire 2A and by connecting the pull-up resistor to the wire 2B, the run-away of the motor 104 can be prevented in a manner similar to that mentioned above.

Figure 7:
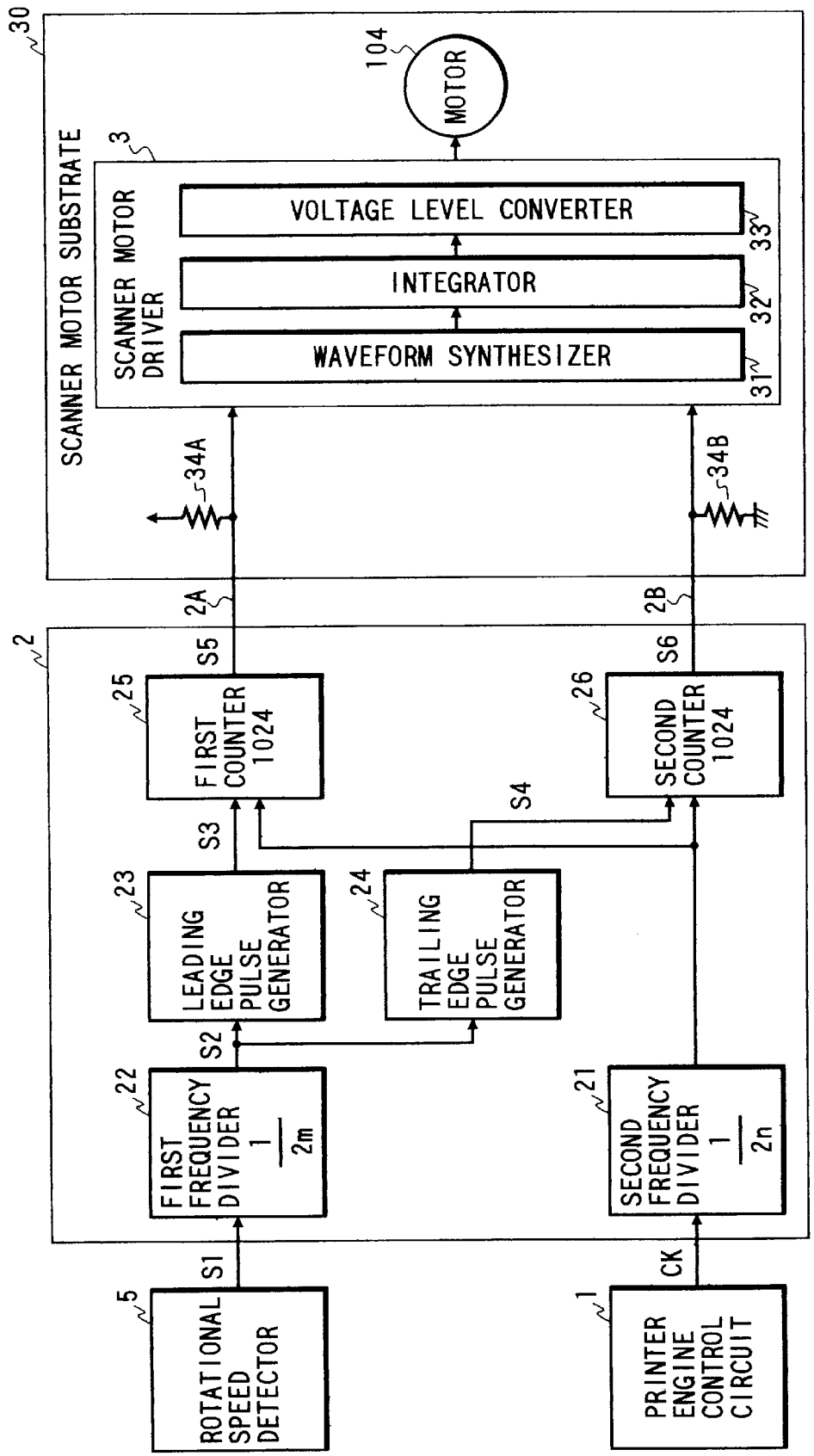
FIG. 7 is a block diagram showing a construction of a scanner motor driving control system according to still another embodiment.

FIG. 7 is a block diagram showing a construction such that the pull-up resistor and pull-down resistor are set to the locations out of the scanner motor driver 3 and in the scanner motor substrate.

Figure 8:
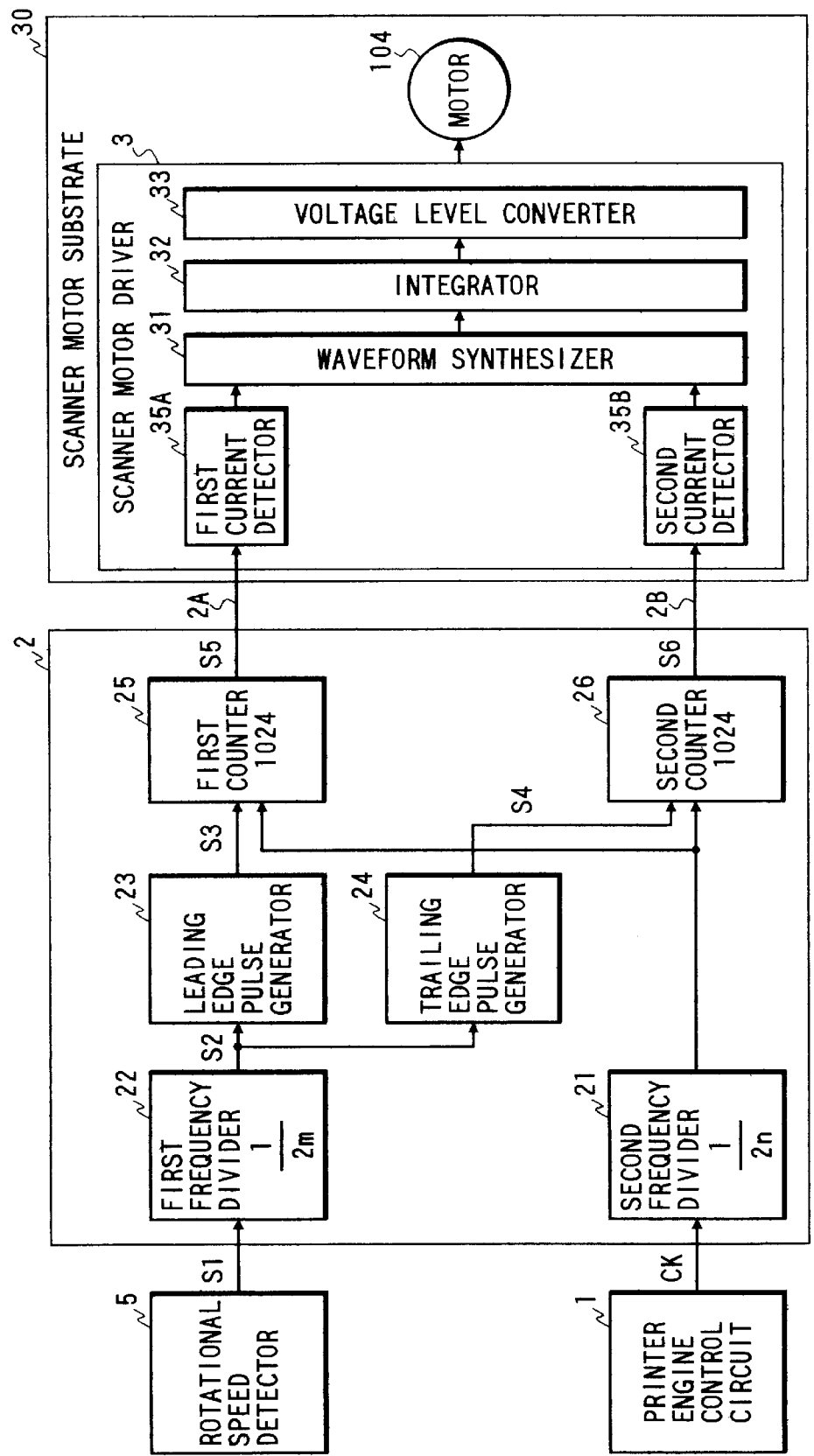
FIG. 8 is a block diagram showing a construction of a scanner motor driving control system according to further another embodiment.
Figure 9:
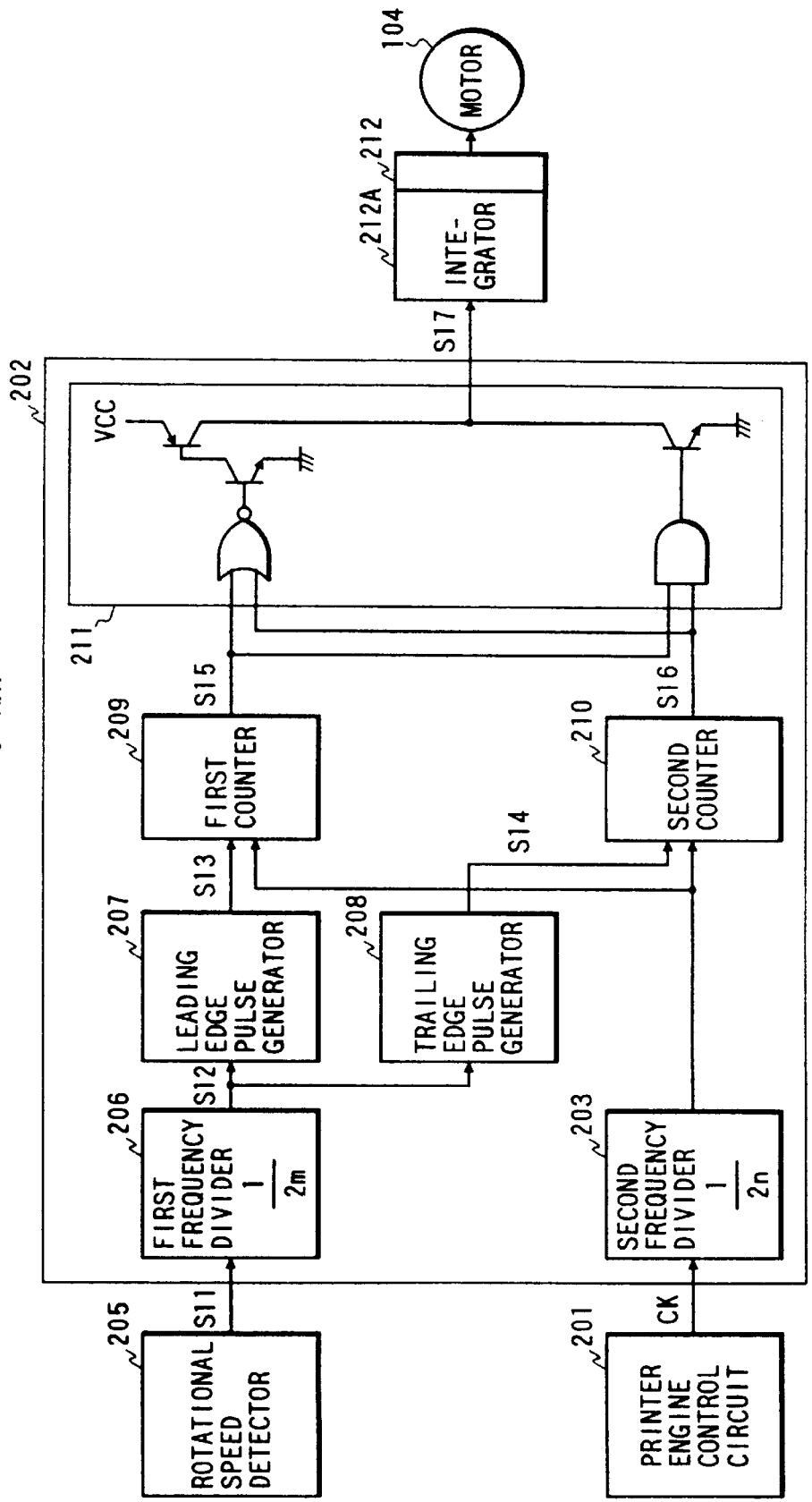
FIG. 9 is a block diagram showing a construction of a conventional scanner motor driving control system.
Figure 10:
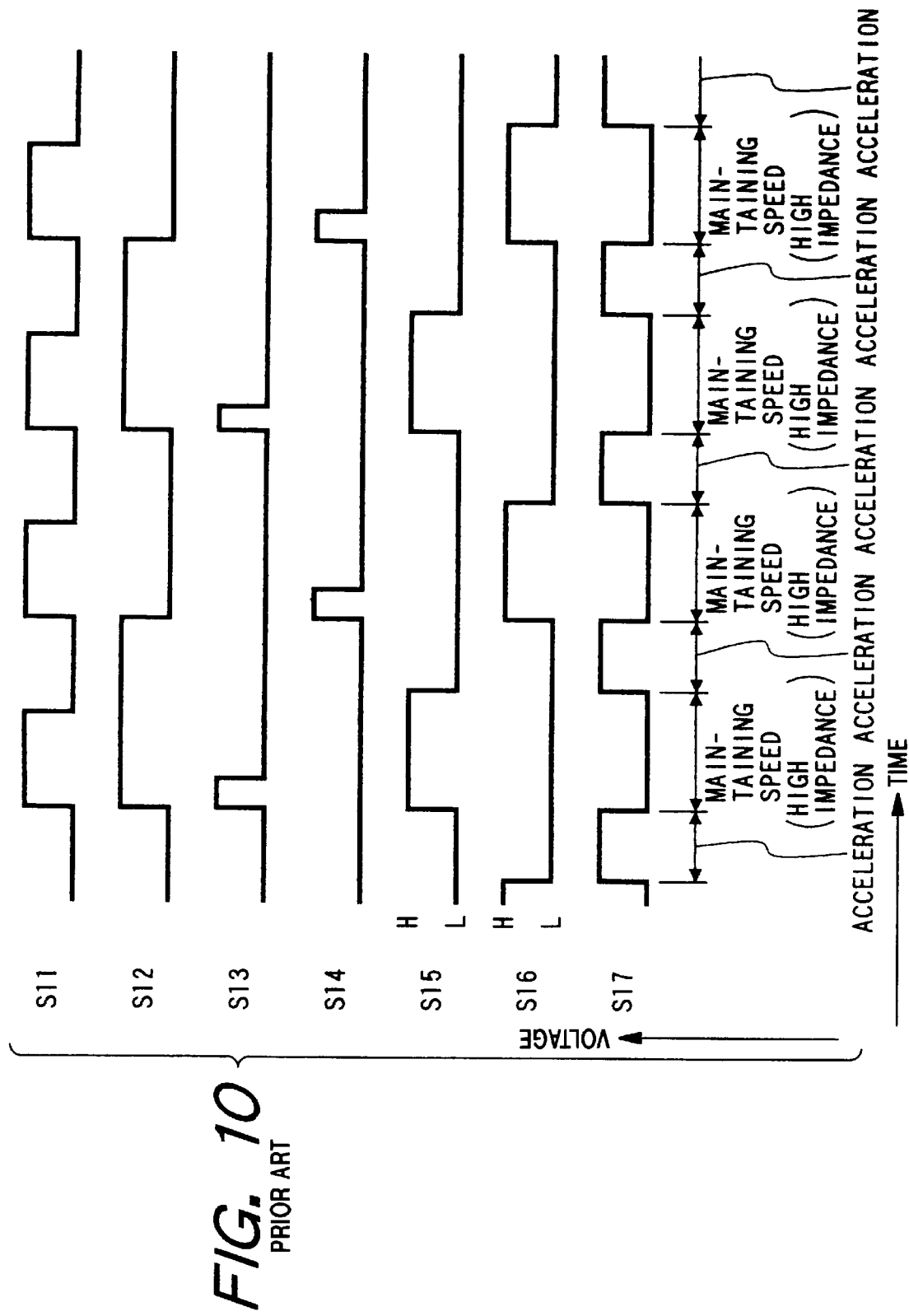
FIG. 10 is a timing chart for signals in a circuit of FIG. 9.

FIG. 8 is a block diagram showing a construction in which a first current detector 35A and a second current detector 35B are provided in the motor driver 3. The first current detector 35A detects a current of the first signal S5. When it is detected that no current flows in the first signal line 2A, it is judged that the normal signal is not transmitted, so that the waveforms are synthesized by the waveform synthesizer 31 so as to set the motor into the deceleration state or neutral state. A voltage according to the level of the synthesized waveforms derived through the integrator 32 is converted into a voltage level of the motor 104 by the voltage level converter 33. The resultant voltage is supplied to the motor 104.

Similarly, the second current detector 35B detects a current of the first signal S6. When it is detected that no current flows in the second signal line 2B, it is judged that the normal signal is not transmitted, so that the waveforms are synthesized by the waveform synthesizer 31 so as to set the motor to the deceleration state or neutral state. A voltage according to the level of the synthesized waveform obtained through the integrator 32 is converted into a voltage level of the motor 104 by the voltage level converter 33. The resultant voltage is supplied to the motor 104. Thus, the run-away of the motor 104 can be prevented.

What is claimed is:

1. A motor rotational speed control apparatus comprising:

control means for performing a first instruction to accelerate a rotational speed of a motor, a second instruction to decelerate, and a third instruction to maintain a rotational speed, said control means representing said first, second and third instructions by a combination of levels of a first and a second signal each having at least two levels;

first and second lines for transferring a first signal and a second signal output from said control means, respectively; and driving means for performing the acceleration, the deceleration and the maintaining of the rotational speed of said motor in response to the first signal and the second signal input via said first and second lines.

2. An apparatus according to claim 1, wherein each of said first and second signals has the high and low signal levels.

3. An apparatus according to claim 1, wherein said instructions of said acceleration and deceleration are represented by combinations of different signal levels and said instruction to maintain the rotational speed is represented by a combination of the same signal level.

4. An apparatus according to claim 1, wherein each of said control means and said driving means is a different integrated circuit.

5. An apparatus according to claim 1, wherein said motor is provided in an image forming apparatus for forming an image onto a sheet.

6. An apparatus according to claim 5, wherein said image forming apparatus is a laser beam printer and said motor rotates a polygon mirror to scan a laser.

7. An apparatus according to claim 1, further having pulse generating means for generating pulses of a period according to the rotational speed of said motor, wherein said control means generates clock pulses of a period corresponding to a target rotational speed, receives the pulses generated by said pulse generating means, and outputs said first and second signals according to both of said pulses.

8. An apparatus according to claim 7, wherein said control means is one integrated circuit.

9. An apparatus according to claim 1, wherein said driving means has means for changing the signal level of at least one of said first signal and said second signal to the level indicative of one of said deceleration instruction and said speed maintaining instruction when at least one of said first and second line is non-conductive.

10. Apparatus according to claim 1, wherein said first and second lines are each composed of wires.

* * * * *

UNITED STATES PATENT AND TRADEMARK OFFICE
CERTIFICATE OF CORRECTION

PATENT NO. : 5,808,431

DATED : September 15, 1998

INVENTOR(S): SATORU KOYAMA ET AL.

Page 1 of 3

It is certified that error appears in the above-identified patent and that said Letters Patent is hereby corrected as shown below:

ON COVER PAGE AT [56] REFERENCES CITED

Under "U.S. Patent Documents":

"Allet et al." should read --Alley et al.--;

"5,442,268    8/1995   Harada" should read
   --5,442,267    8/1995   Harada--.

Under "Foreign Patent Documents":

"58-069483   7/1983   Japan" should read
    --58-069483   4/1983 Japan--.

COLUMN 3

Line 36, "further" should read --still--.

UNITED STATES PATENT AND TRADEMARK OFFICE
CERTIFICATE OF CORRECTION

PATENT NO. : 5,808,431

DATED : September 15, 1998

INVENTOR(S): SATORU KOYAMA ET AL.

It is certified that error appears in the above-identified patent and that said Letters Patent is hereby corrected as shown below:

COLUMN 5

Line 6, "2through" should read --2 through--;
Line 39, "T,140." should be deleted; and insert:

TABLE 3

| 1st signal S5 | 2nd signal S6 | Driver 3 |
|---|---|---|
| H | H | neutral |
| H | L | deceleration |
| L | H | acceleration |
| L | L | neutral |

COLUMN 6

Line 39, "level and" should read --level, and--.

UNITED STATES PATENT AND TRADEMARK OFFICE
CERTIFICATE OF CORRECTION

PATENT NO. : 5,808,431

DATED : September 15, 1998

INVENTOR(S): SATORU KOYAMA ET AL.

It is certified that error appears in the above-identified patent and that said Letters Patent is hereby corrected as shown below:

<u>COLUMN 8</u>

Line 28, "Apparatus" should read --An apparatus--.

Signed and Sealed this

Twenty-seventh Day of April, 1999

*Attest:*

Q. TODD DICKINSON

*Attesting Officer*     *Acting Commissioner of Patents and Trademarks*